United States Patent [19]

Eberlin et al.

[11] 4,335,452

[45] Jun. 15, 1982

[54] ELECTRO-ACOUSTIC DEVICE FOR THE UNDERWATER SIGNALLING AND IDENTIFICATION OF A VESSEL

[75] Inventors: Philippe Eberlin, Geneva; Mario Rossi, Lausanne, both of Switzerland

[73] Assignee: Blanchut & Bertrand S.A., Switzerland

[21] Appl. No.: 178,379

[22] Filed: Aug. 13, 1980

[30] Foreign Application Priority Data

Aug. 14, 1979 [CH] Switzerland ............. 7424/79

[51] Int. Cl.$^3$ ........................................... H04B 11/00
[52] U.S. Cl. ..................................... 367/134; 367/138
[58] Field of Search ............... 367/131, 133, 134, 137, 367/138

[56] References Cited

U.S. PATENT DOCUMENTS 3,336,571 8/1967 Johnson et al. ............... 367/134
4,122,430 10/1978 Leisterer et al. ............... 367/138

*Primary Examiner*—Richard A. Farley

*Attorney, Agent, or Firm*—Ostrolenk, Faber, Gerb & Soffen

[57] ABSTRACT

The underwater signalling and identification device comprises an emitter (5) having four submerged transducers (10 to 13) arranged to form a square and fitted in a water-tight case (25) placed above an opening (7) formed in the hull of a ship, and also comprises a transducer-control circuit designed to emit an identification signal specific to the vessel and made up of a series of figures or letters in Morse code, the signal being emitted at at least one frequency selected as a function of the sound spectrum of the vessel and falling within the range of 4 to 6 kHz, the strength of emission of the signal being in accordance with the relationship $$LI_{sl} \geq LI_{bl} + \Delta(dB),$$

wherein $LI_{sl}$ is the level of acoustic intensity converted to the unit of distance of the identification signal of mean frequency $f_s$.

10 Claims, 6 Drawing Figures

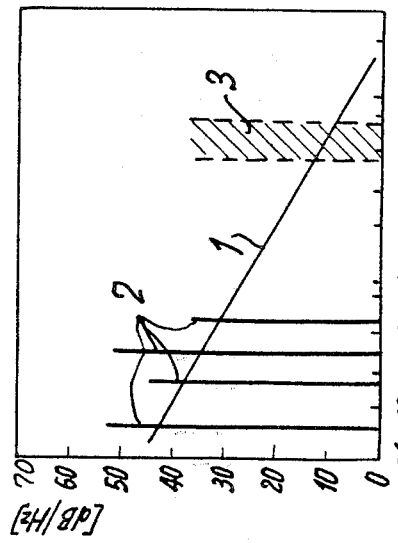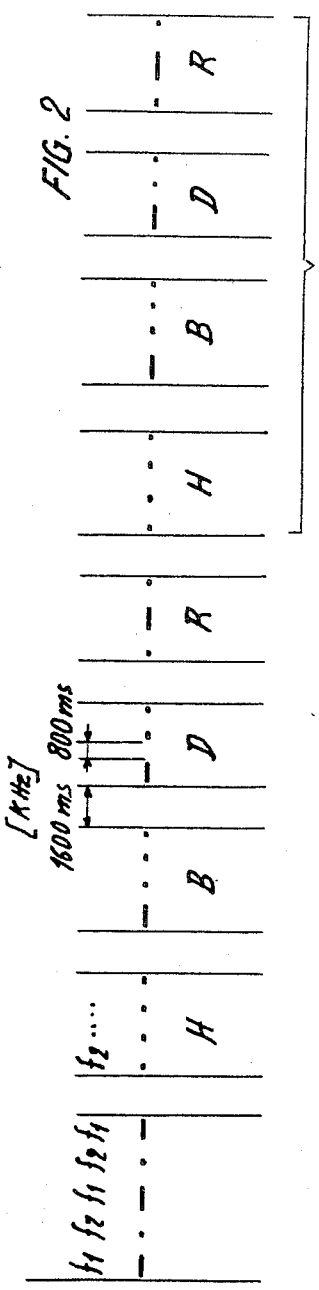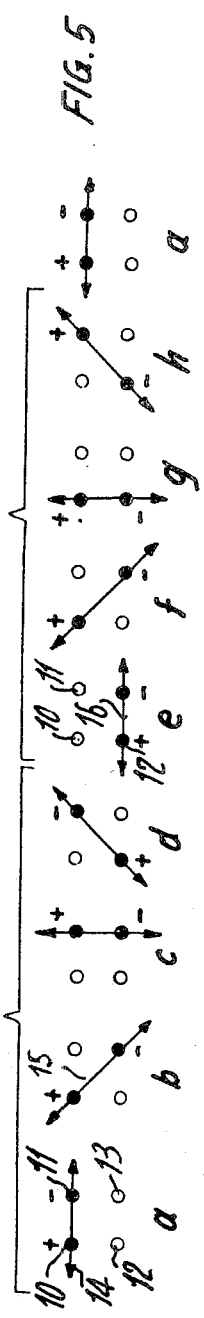

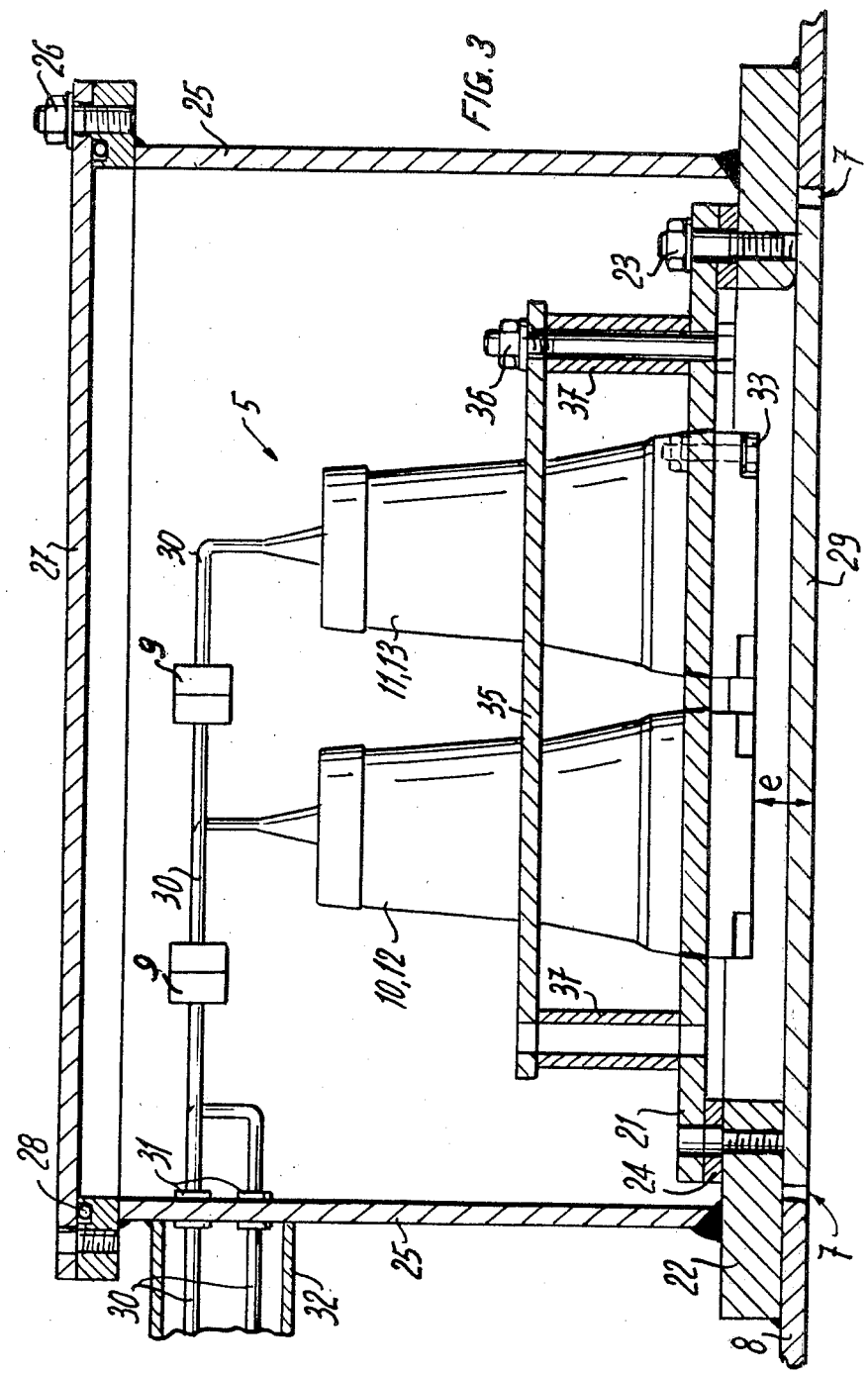

ELECTRO-ACOUSTIC DEVICE FOR THE UNDERWATER SIGNALLING AND IDENTIFICATION OF A VESSEL

BACKGROUND OF THE INVENTION

The present invention relates to an electro-acoustic device or apparatus for the underwater signalling and identification of a vessel which is intended to prevent, during armed conflict, untimely underwater attack on neutral vessels, hospital ships, health-service vessels, rescue vessels and generally those craft protected by the Geneva Conventions.

The main object of the conventional submarine service is always that of destroying the merchant tonnage of the enemy or enemies so as to achieve their maritime blockade. The nature of anti-submarine warfare and the activities of underwater vessels require that these vessels remain deeply submerged, maintain silence on board and, by means of passive sonars, listen for underwater noises in their patrol zone. After a target has been detected, it is destroyed by different types of torpedo, for example of the cable-guided and acoustic types, which have ranges of up to twenty-five nautical miles. In these circumstances the detection and identification of a possible target are achieved solely by sound and practically never by sight; certainly, a submarine can hardly be allowed to surface with its periscope down because of the great danger of being detected and rapidly destroyed. When moving, a vessel emits an underwater noise e.g., the whirr of its propellers, the noise of the main and auxiliary engines, the wash along its stem and vibrations due to its advance through the water.

This noise forms the basis for detecting and identifying vessels by submarines with the aid of passive sonars. These latter are directional listening networks which cover the horizon sector by sector. They consist generally of hydrophones, compensation networks, amplifiers and various systems for processing signals. They are in the charge of trained operators who listen to the noises that are picked up and are aided by automatic indicators which have been developed largely to suit the various marine nations and the class of submarine. As a rule, listening by trained operators is the simplest method and is in general use in all types of submarines.

Increase in the noise level at the outputs of the passive sonar at a given bearing leads to the detection of a possible target. The spectral characteristics of the signal (acoustic signature) permit a friend or an enemy to be detected and enable the type of craft to be identified (cargo vessels, submarine chasers, fighting vessels, etc.).

Although, in theory, it is possible to identify any vessel by its acoustic signature, in practice this can only be achieved in the case of certain known vessels or types of vessels of each maritime nation.

In particular, it is practically impossible to differentiate between, on the one hand, neutral transport vessels and those protected by the Geneva Conventions, and, on the other hand, transport vessels belonging to the enemy. In the event of war, the first-mentioned vessels will be regarded as non-friendly and will therefore run a very grave risk of being sunk without warning. In these circumstances, a naval power will be able to exercise a total maritime blockade against neutrals and the hospital services by claiming that it is impossible to guarantee immunity to their vessels in view of the submarine danger.

Such a situation is grave for neutrals, and in particular for Switzerland, whose supplies by sea route would be dangerously threatened or even cut off in the event of a crisis or armed conflict. Furthermore, because of this bias, neutrals would be subjected to intolerable political pressures by the belligerents.

Hitherto, no underwater acoustic signalling and identification system has been developed and used. It will be remembered, however, that in 1917, an agreement between the belligerent nations had provided that allied hospital ships should be accompanied by paddle vessels. Their particular acoustic signature enabled hospital ship convoys to be identified by German submarines. In 1972, at the Conference of government experts regarding the reaffirmation and development of international human rights regarding armed conflicts, the International Red Cross Committee dealt with the signalling and identification of hospital ships. The problem of protection against underwater attacks was raised in the technical memorandum (Geneva, April 1972). It was there suggested that an audible underwater signal having a suitable pitch should be sent out. Australian experts proposed the introduction into the technical appendix of the Geneva Conventions, a new clause relating to underwater acoustic signalling of the presence of hospital ships. The context of this clause is as follows:

1. Ships and places of embarkation concerned with hospital services could be identified by a signal transmitted by a multi-directional sonar.
2. The strength of the emitted signals was to be at least equal to that radiated in the water in the emission frequency band by the vessels in question at their maximum cruising speed.
3. The signal was to be transmitted sequentially at frequencies of 3, 6 and 12 kHz and was to consist of the letters HS (Hotel Sierra) in morse code and transmitted three times at each frequency, each group of three transmissions being followed by a continuous signal of five seconds at the same frequency. The transmission cycle would be repeated at intervals of two minutes maximum.

This proposal has not yet resulted in the setting up of a signalling system, and on the basis of calculations carried out by the present inventors, this system would not be able to operate satisfactorily.

SUMMARY OF THE INVENTION

The main object of the present invention is to provide a device enabling submarines to identify ships by the emission of an underwater acoustic signal. By installing such a device and other identification systems aboard its ships (to prevent attacks by air, by surface craft or by coastal batteries), a neutral state would be able to claim immunity for the vessels at sea, while at the same time submitting them to the controls associated with a possible blockade. Another object of this invention resides in such a construction of the proposed device that it can be used only for the purpose of signalling the presence of and identifying the vessel using it. It therefore cannot be used for detecting and determining the position of submarines.

The device in accordance with the invention comprises an emitter having at least one electro-acoustic transducer mounted at subaqueous parts of the hull of the vessel, and an electronic circuit for controlling said transducer, the emitter being designed to emit, at audio-frequency, an identification signal specific to the vessel, said signal being constituted by a series of letters or figures emitted in code and preceded by a start-of-emission signal, the emitter and its control circuit being so rated that the signal is emitted at at least one frequency selected for each vessel and being within the range 4 to 6 kHz and simultaneously in the proper sound spectrum of the vessel but above the discrete frequencies of the vertical lines of said spectrum and different from their harmonics and at a strength such that the level of acoustic intensity $LI_{s1}$ (dB), converted to unit of distance, of the identification signal of mean frequency $f_s$ (Hz), is greater than or equal to the level of acoustic intensity $LI_{b1}$, converted to unit of distance, of the sound band, centred on the frequency $f_b$ (Hz), resulting in the detection, from a great distance, of the carrier vessel by its particular underwater noise in the ambient background noise of the sea, increased by a parameter $\Delta$, the value of which in decibels is calculated by means of the relationship:

$$\Delta = 40\alpha_s + 10 \log (B_{cs}/B_{cb}) - 15 \log (f_s/f_b) + 6,$$

wherein:
$\alpha_s$ = the coefficient of absorption of sound in the sea at the frequency $f_s$,
$B_{cs}$ and $B_{cb}$ (Hz) = the critical screening bands at the frequencies $f_s$ and $f_b$ respectively.

Satisfactory results have been obtained for $\Delta$ values of 7, 14 and 19 dB for corresponding emission frequencies of 4, 5 and 6 kHz.

The emission circuit is preferably designed to produce, in code, signs representing figures and letters, the duration of which is approximately 100 to 800 ms, the gaps between signs being about 800 ms and the gaps between groups of signs, which represent a figure or a letter, being about 1600 ms.

The identification signal may be in Morse code, the dot signs preferably having a duration of about 200 ms, and the dash signs a duration of about 700 ms.

The circuit may be so designed as to produce an emission signal at two frequencies $f_1$ and $f_2$ differing from each other by several tens of Hz, up to about 200 Hz, the odd signs in the succession of signs forming the signal being transmitted at the frequency $f_1$ and the even signs forming the signal being transmitted at the frequency $f_2$.

In a preferred embodiment, the emitter comprises four transducers arranged in a square, the control circuit having switches adapted to connect the transducers two by two in opposite phase in two times four successive arrangements, each forming a sequence, so as to cover the horizon in two times four emission sectors, a complete signal code being emitted for each two by two arrangement, with intermediate pauses.

The emitter is preferably mounted in a water-tight case in the bottom of the vessel above a window formed in the hull, the transducer or transducers being positioned vertically with their emission diaphragms substantially in the plane of the opening in the hull.

The control circuit of the emitter comprises an impulse generator functioning as a timer and connected to a sequencer controlling the succession of operations terminating in the formation of the coded signal, itself connected with the emitter through an encoder producing at least one signal-emission frequency, and through an amplifier, the generator being connected to a control panel enabling all the emission parameters to be selected. The encoder is connected to the amplifier through a wave form converter which transforms the square impulses produced by the encoder into sinusoidal impulses, and switching relays for the transducers are arranged between the amplifier and the emitter, the relays being controlled by the sequencer connected directly to the control panel.

It will be seen that the means in accordance with the invention enables a submarine to identify the vessel carrying said means, since the frequency of the identification signal is between 4 and 6 kHz, that is to say within the spectrum of the noise from the ship which will be detected by the submarine. In fact, submarines carry at least one passive listening sonar having a frequency generally ranging from 500 Hz to approximately 7 kHz. They generally have several sonars which enable the frequencies of from 100 to 50,000 Hz to be covered. Consequently, as soon as the submarine begins to detect the presence of a ship, the identification signal will reach it, since said signal is emitted at a frequency different from the vertical lines of the noise spectrum and from their harmonics (corresponding to the machine noises within the ship), so that the signal is not confused with or masked by these lines or their harmonies. On the other hand, the strength of the emitted signal should be reduced as much as possible so as to limit the space occupied by, and the cost of the emission means, but the signal should be strong enough for it to be always detected and recognized when the ship is detected by its own underwater noise (noise caused by forward movement of the ship, wash, propellers etc.) in the surrounding basic noise from the sea, under conditions which are less favourable for the signal and more favourable for the characteristic noise.

BRIEF DESCRIPTION OF THE DRAWINGS

One embodiment of an electro-acoustic signalling and identification device in accordance with the invention is shown by the way of example, in the drawings, in which:

FIG. 1 is a diagram illustrating the general nature of the typical spectrum of the characteristic underwater noise emitted by a surface vessel at a distance of at least several hundred meters.

FIG. 2 shows in graph form a basic signalling and identification code of a particular ship, the code being formed by letters emitted in Morse, FIG. 3 is a vertical section through an electro-acoustic emitter comprising four transducers set up in the double bottom of a ship carrying the equipment, the emitter sending out its signalling and identification emission through a hole formed in the hull for this purpose, FIG. 5 is an explanatory sketch illustrating how the horizon is swept by the emission of the signalling and identification code in four successive sectors representing an emission sequence.

DESCRIPTION OF THE PREFERRED EMBODIMENT

Figure 4:
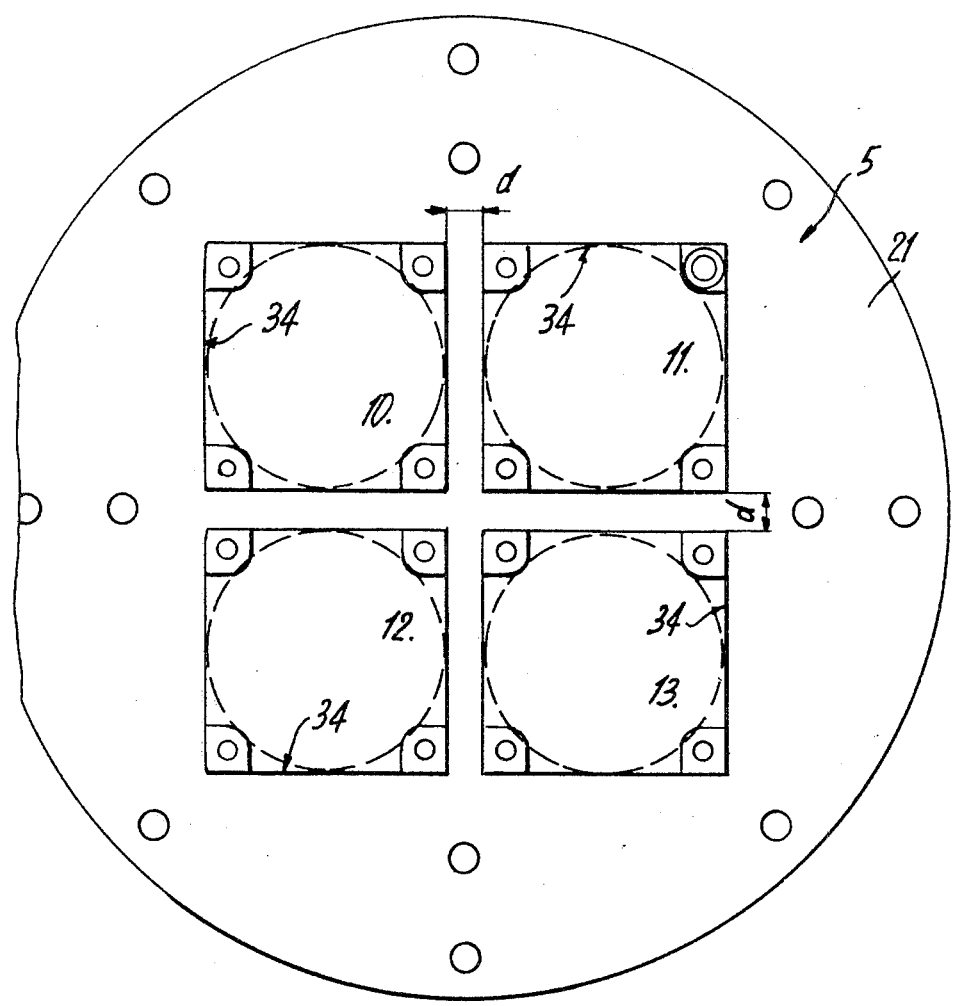
FIG. 4 is an underwater view of the emitter shown in section in FIG. 3, and shows the four electro-acoustic emission transducers mounted on a baseplate forming part of a water-tight case solidly connected to the hull of the vessel in which the emitter is set up.

Before proceeding to a description of the embodiment of the signalling and identification device, some explanations will first be given in connection with the technical considerations on which the embodiment is based.

The principle, on which the signalling and identification means are based, consists in the periodic emission in Morse of an identification code containing the call sign of the ship carrying the equipment. The emission is carried out by all or nothing modulation of a wave maintained at audio-frequency. The frequencies, strengths, durations and rhythm of the Morse signs of the emitted code are the characteristic parameters of the equipment. They have been determined on the basis of the two following criteria:

The identification code must of necessity be recognized by a submarine when the latter detects the underwater noise typical of the ship equipped with the apparatus.

The emission strength must be as low as possible so as to reduce the space occupied by, and the cost of, the equipment, and to enable the equipment to be installed in small vessels, but the emission strength must be great enough to meet the first criterion.

The parameters are determined by calculations, simulation and tests, the following factors being taken into consideration:

1. The underwater noise of the vessel itself, the spectrum of which is illustrated in FIG. 1. The typical spectrum is composed of a continuous part 1 (noise from wash, forward movement and propellers) and of lines 2 (noise from main and auxiliary engines) corresponding to discrete frequencies and diminishing with frequency. As illustrated in FIG. 1, the noise due to the forward movement of the ship and represented by the line 1 is made up of frequencies of up to 20 kHz. The vertical lines 2 representing the noise of the main and auxiliary engines within the hull generally have frequencies that are greater, the higher the speed of the ship or the lower its tonnage. On the other hand, these lines 2 always have harmonics that have to be taken into account. Following numerous calculations and tests, the inventors have reached the conclusion that the emission-frequency band of the identification signal should be between 4 and 6 kHz. This frequency band is represented at 3 in the diagram showing the noise from the vessel itself.

2. Identification of a vessel: the acoustic signature of a vessel consists mainly of the lines of the spectrum of the noise from the vessel itself. It is however, obvious that these lines should be known so that the vessel can be identified. The emission of a recognition signal in the noise spectrum of a vessel itself is therefore indispensible for confirming the acoustic signature of said vessel, the more so since this signature may vary as a function of the external conditions as explained below.

3. Underwater propagation of the sound: the hypothesis of normal propagation causes the intervention of a decrease in sound by geometrical divergence (the $r^{-1}$ or $r^{-2}$ factor, where r is the distance from the source), and attenuation by absorption; the latter increases exponentially with the distance r, and rises rapidly with the frequency of the sound.

4. Irregularities in propagation: because of the propagation conditions in the sea (reflection from the bed and the continuously moving surface, curving of the sound radiations due to bathythermy), the acoustic signal picked up at a given point undergoes considerable changes in level (similar to the fading of radio-electric waves in the atmosphere); in particular, a signal of short duration at emission (for example the dots and dashes of a Morse code) may result in the reception of two signals or even more; thus, a dash may be repeated by a strong echo and will be interpreted, on reception, as being two dots; a dash may be divided into two parts and interpreted as being two dots or a dash and a dot, or a dot and a dash, etc.

5. Masking of the identification code: in order to be detected and identified by a trained operator or an automatic analyzing device, within the noise associated with the ship carrying the equipment or the ambient background noise (noise from the sea-bed), the code, on reception, must have an intensity depending upon its frequency and the spectra of the masking noises.

As a function of the criteria and conditions defined above, the identification code C is illustrated in FIG. 2 and is formed in the following way:

The basic code C, representing the identification signal in the 4 to 6 kHz frequency band, is composed of start-of-transmission signal and the cell sign of the ship carrying the equipment, which signals may be repeated a second time. The start-of-transmission signal $-.-.-$ facilitates identification of the dash-dot Morse signs, the durations and relationship of which are different from those used in telegraphy, since they depend upon the conditions imposed by the underwater propagation of sound. As an example, FIG. 2 shows the code of the Swiss motor vessel Regina, the radio call sign of which is H B D R. The code C will be used and emitted in Morse on the frequency band having a total range of 4 to 6 kHz. The duration of the Morse signs is 200 ms for the dots (.) and 700 ms for the dashes (-). The gaps between signs are 800 ms, and between letters 1600 ms. With a view to particular propagation conditions, these durations are programmable and can be varied in increments of 100 ms between 100 and 800 ms for the dots and dashes, and of 200 or 400 ms between 200 and 3200 ms for the gaps.

For each vessel, two different emission frequencies $f_1$ and $f_2$ will be selected in the 4 to 6 kHz band and will differ from each other by several tens of Hz up to 200 Hz. Quite clearly, they will be selected as a function of the acoustic signature of the vessels to be fitted out with the equipment (FIG. 1) so as not to fall within the lines 1 of the spectrum or within their harmonics, and choice will also take into account the dimensions and space occupied by the emitter. For each sign (dot or dash) of the code C, a series of sinusoidals of adequate duration is emitted in turn at the two frequencies $f_1$ and $f_2$. The series of signs of the uneven kind are emitted at the $f_1$ frequency, and those of the even kind at the $f_2$ frequency. Emission is stopped between two signs for a period corresponding to the sign space or the latter space.

To avoid having to use a high-power multi-directional emitter, the emission is directed with a directivity axis which is variable in a stepwise manner. The entire horizon is then covered sector by sector by sequential switching of the directivity axis, a complete code being emitted in each position.

An emission sequence S is constituted by a certain number of codes C separated by pauses P (periods of silence) of programmable duration (10, 20, 30, 40 and 60 s). For example, for scanning the horizon in four sectors, the emission frequency consists of four codes C and of three pauses P, i.e.:

C-P-C-P-C-P-C. The manner in which the horizon is scanned in four sectors will be explained below with reference to FIG. 5.

The emission of a sequence S is entirely automatic. A time base enables the number of sequences per hour to be set at 1, 2, 3, 4 or 8. For a maximum range of 40 km, the emission strength $P_a$ must be such that $$LI_{s1} \geq LI_{b1} + \Delta, \text{ (dB)},$$

wherein $LI_{s1}$ is the level of acoustic intensity, by unit of distance, of the identification signal of mean frequency $f_s$ (Hz); this level is defined as the minimum in the emission directions corresponding to the intersections of the directivity lobes adjacent the emitter, in the case of surface scanning sector by sector.

$LI_{b1}$ is the level of acoustic intensity, to unit of distance, of the sound band centered on the frequency $f_b$ (Hz), resulting in the detection, at a great distance, of the vessel carrying the equipment, by its characteristic underwater noise, in the ambient sea-bed noise.

$LI_{s1}$ and $LI_{b1}$ are expressed in decibels in relation to the reference intensity Ir, equal to 6.5 nW/m² in underwater acoustics.

$\Delta$ is a parameter, the value of which in decibels, is calculated by means of the general formula $$\Delta = \Delta\alpha \cdot r + 10 \log (B_{cs}/B_{cb}) - 15 \log (f_s/f_b) + \Delta M - \Delta D, \text{ (dB)}$$

wherein $\Delta\alpha$ (dB/km) is the difference between the sound-absorption characteristics in sea-water at the frequencies $f_s$ and $f_b$, r (km) is the maximum range for detecting the vessel carrying the equipment, by a frequency band centred on $f_b$, by the characteristic underwater sound of the vessel, in the surrounding background noise of the sea, $B_{cs}$ and $B_{cb}$ (Hz) are critical masking bands having frequencies $f_s$ and $f_b$ respectively $\Delta M$ (dB) is the difference between the perception conditions at the frequencies $f_s$ and $f_b$ of a signal in an output sound from a passive sonar, and $\Delta D$ (dB) is the difference in the directivities of a passive sonar at the frequencies $f_s$ and $f_b$.

Taking into account a maximum required range of 40 km and of the most favourable situation for the detection of the vessel and the least favourable situation for receiving the identification signal, the following simplified practical formula is obtained:

$$\Delta = 40 \cdot \alpha_s + 10 \log (B_{cs}/B_{cb}) - 15 \log (f_s/f_b) + 6,$$

wherein $B_{cs}$, $B_{cb}$, $f_s$ and $f_b$ are as above, and $\alpha_s$ is the coefficient of absorption of the sound in the sea at the frequency $f_s$.

By way of example, when $f_b = 1$ kHz and for frequencies $f_s$ of 4, 5 and 6 kHz, the values obtained for $\Delta$ are 7, 14 and 19 dB respectively.

However, the emission strength must be limited so as to avoid cavitation opposite the transducers. In particular, in the case of a small depth, the vessel will adopt a cruising speed so as to reduce $NI_{bp1}$, emission strength being limited.

Figure 6:
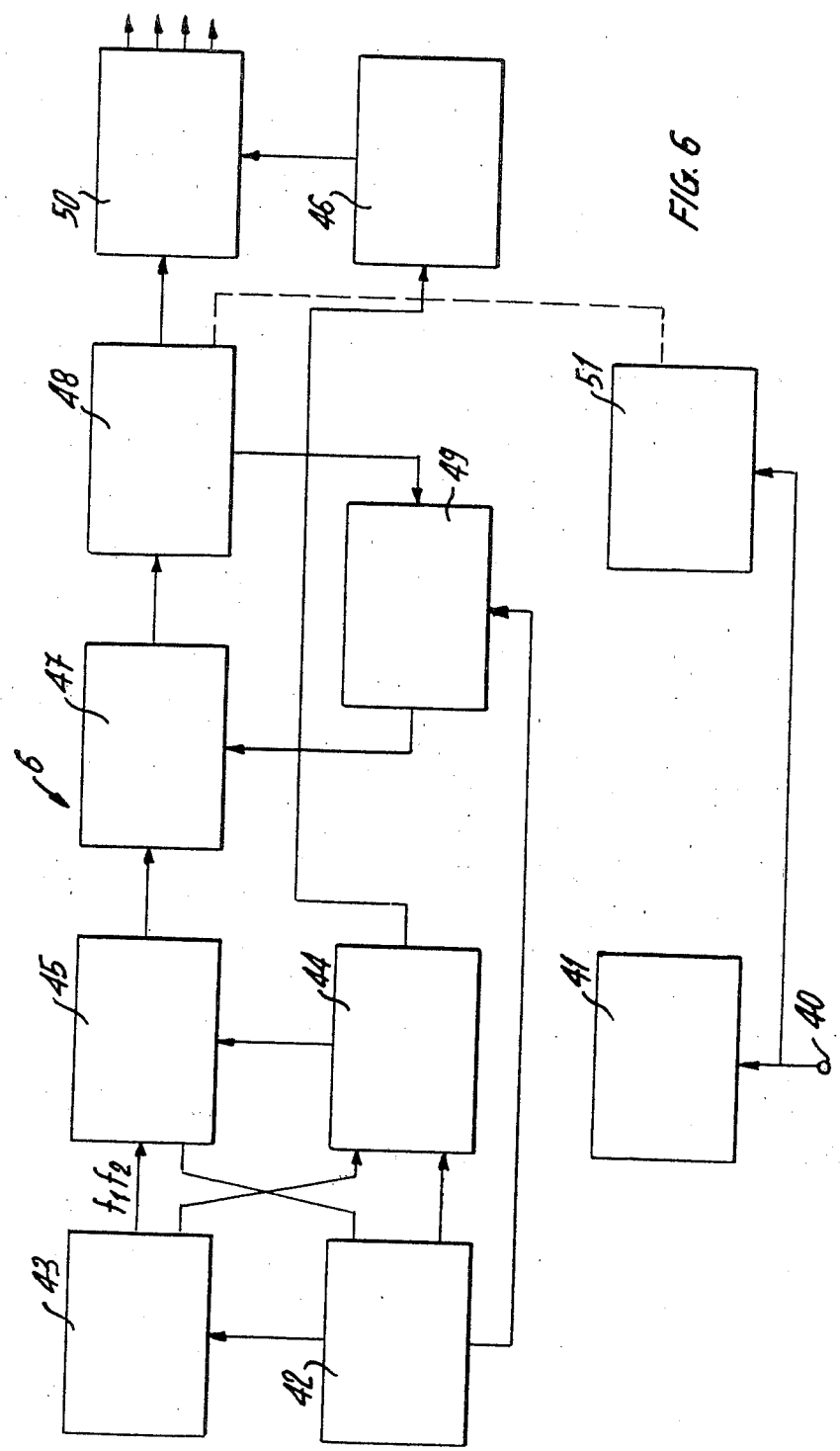
FIG. 6 is a block circuit diagram relating to the control of the transducers illustrated in FIGS. 3 and 4.

FIGS. 3, 4 and 6 respectively, illustrate an electro-acoustic emitter 5 and a cabinet containing the control circuits 6 of the emitter 5. The emitter 5 is located in the double bottom of the vessel carrying it, and radiates directly into the sea through opening 7 (FIG. 3) formed in the hull 8 for this purpose. The control cabinet containing the circuit 6 (FIG. 6) is situated in the machine room or in associated areas or in any other area having the required conditions. It is connected, on the one hand, to the electric power system aboard the vessel and, on the other hand, to the electro-acoustic emitter by means of suitable electric supply lines 30 (FIG. 3).

The emitter 5 comprises four electro-acoustic transducers 10, 11, 12 and 13 disposed vertically; the speaker faces of the transducers face the sea-bed, are arranged in a square and are each supplied separately by electric lines 30 running from the cabinet containing the control circuits 6. The four transducers form an emission system. The configuration of this system (distances between axes, supply-voltage phases) is so selected as to provide the various required directivities at the envisaged working frequencies. By switching the supplies of the transducers, directivity variable in a stepwise manner and covering the horizon sector by sector is achieved.

FIG. 5 illustrates how the supplies of the four transducers 10 to 13 are switched so as to emit the complete identification codes in accordance with the arrangement shown in FIG. 2 and successively in dependence upon four different axes. As shown in the sketch of FIG. 5a, the two transducers 10 and 11 are supplied in phase opposition, that is to say using a 180° phase displacement represented by the signs + and −. There is then obtained an emission in the two directions in accordance with the direction represented by the line 14 in FIG. 5a. The entire code representing the signal in FIG. 1 is emitted, and then the control circuit of FIG. 6 alters the switching of the transducers in accordance with the sketch of FIG. 5b. After this switching change, the code C is again emitted in the two directions of the line 15 in FIG. 5b. Between the two emissions there is a pause as described above. Next come successive emissions with intermediate pauses in the directions shown in FIGS. 5c and 5d, the four codes emitted as shown in FIG. 5a to 5d representing a sequence. In the second sequence of the four codes as in FIGS. 5e, 5f, 5g and 5h, emission again takes place along the same four axes, but with different transducers. In fact, in FIG. 5e, emission takes place along an axis 16 parallel with the axis 14 of FIG. 5a, with the transducers 12 and 13 instead of the transducers 10 and 11. This manner of switching enables the times during which each transducer is used to be balanced so as to avoid excessively rapid ageing of one transducer as compared with another. At the end of the two sequences of four codes each, the FIG. 5a connection is arrived at, and the cycle starts again. The sequences described make it possible, with the aid of four transducers switched two by two, to scan the horizon in four sectors in accordance with the four axes illustrated in FIG. 5, while ensuring that the signal is sent out in a satisfactory manner all round the vessel emitting it. However, it will be obvious that the horizon can also be scanned with a greater number of transducers switched in two by two or three by three. All combinations are possible, and the only limiting factors are cost and space.

It will also be obvious to the expert that an emitter consisting of three transducers switched in two by two or alternatively supplied in combinations of one transducer, then two, etc. may also be satisfactory. In the extreme case, a single transducer can be used. Then it will be obvious that the main vertical emission component, directed downwardly, will be lost. Therefore, a single transducer would of necessity have to be of much greater power in view of the fact that a considerable portion of its emission power is directed towards the sea-bed and is completely lost.

In the case where a single transducer is used, it is also possible to place it horizontally on a device, not illustrated, designed to rotate through 360° about the vertical.

A combination of four transducers such as has been described in the arrangement shown in FIGS. 3 to 6 has given excellent results, since the fact that these transducers are connected two by two in phase opposition results in substantially horizontal emission components.

The emitter 5 is mounted in a circular opening formed in the double bottom of the carrier vessel and preferably in a water ballast. It is located approximately in the rear third of the ship and at such lateral distance from the keel that suffices to prevent its being damaged by keel blocks when the vessel is in dry dock or an a floating dock.

FIGS. 3 and 4 show typical arrangements relating to the construction of the emitter 5. In this example, the four transducers 10 to 13 are type TR-61A electro-acoustic transducers supplied by Messrs. Massa. These are piezoelectric transducers which are commercially available. It goes without saying that any other transducer having similar or superior characteristics may be used. The transducers are mounted vertically on a baseplate 21 (FIGS. 3 and 4). Seen from below (at the side facing the sea), the speaker faces of the transducers are, as stated above, arranged to form a square, the lateral distance d between adjacent transducers being as small as possible in view of the problems relating to the construction of the layout. The circular opening 7 (FIG. 3) is cut in the hull of the vessel, and its edge is reinforced by a ring 22. The baseplate 21 is secured to the ring 22 by means of screw-bolts 23. Two positions are possible: in the first, the sides of the squares formed by the transducers are parallel with and perpendicular to, respectively, the longitudinal axis of the vessel. In the second position, the diagonals of this square occupy these positions. An intermediate ring 24 is placed between the reinforcing ring 22 and the baseplate 21 so as to create a distance e between the speaker faces of the transducers and the outer face of the hull 8, said distance being between 25 and 35 mm. The emitter 5 is surrounded by a water-tight case 25 welded on to the reinforcing ring 22 and closed off by a cover 27 with the aid of screw-bolts 26. A water-tight joint 28 is fitted between the case 25 and the cover 27. When the emitter is not being used, a removable protective plate 29 is bolted into the opening 7 in the hull 8. Electrical lines 30 supplying the transducers 10 to 13 pass through the water-tight case in glands 31 and extend to the electronic control cabinet, not illustrated, by way of a protective pipe 32 and the pipework tunnel of the vessel. The transducers 10 to 13 are finally held against the baseplate 21 by means of bolts 33 after having been introduced into cut-away portions 34 (FIG. 4) previously provided in the plate 21 and corresponding to the lower periphery of the transducers; these cut-away portions are of frustoconical section which is carefully machined so that they can be closely fitted around the transducers so as to ensure that the emitter is water-tight. As illustrated in FIG. 3, the transducers 10 to 13 are also held at their upper portions by a frame 35 which is solidly attached to the plate 31 by means of bolts 36, the distance between the plate 21 and the frame 35 being maintained by means of spacers 37. The lines 30 are interconnected within the case 25 with the aid of water-tight connecting means 9.

The dimensions and constructions of the assembly will vary from case to case as a function of the available space and the requirements of the rating companies.

The block diagram shown in FIG. 6 illustrates the functional structure of the circuits 6 of the electric control cabinet.

A supply block 41 is connected to the ship's supply system 40 by way of circuit-breakers and switches, not illustrated, and supplies the various voltages required for operating the equipment and the circuits. The control element 42 enables the user to control the system and to set the emission parameters; it is provided with switches and push-buttons, not illustrated, certain of these being directly accessible on a front panel and others not. The control element 42 permits the selection of the duration of the Morse signals emitted (dot, dash), the duration of the pauses between each code, the duration between sequences etc.

An encoder 45 is connected, on the one hand, to the generator 43 and, on the other hand, to the sequencer 44, and it generates a series of square signals whose frequency alternates between $f_1$ and $f_2$, and whose duration and rhythm correspond to the signalling code C to be emitted. This latter is contained in a store which is specifically programmed for each vessel and which cannot be changed or modified at a later stage.

An interface 46 energizes relays 50 under the control of the sequencer 44.

A wave form converter 47 transforms the square series from the encoder 45 into a sinusoidal series, the amplitude of which is controlled by a control device 49.

An amplifier 48 provides the active power required by the emitter and offsets its reactive power by means of suitable reactances.

The control means 49 enables the power supplied to the emitter to be controlled by action on the gain of the conditioner 47. It also protects the amplifier 48 from overload, for example, from a short-circuit.

The relays 50 energized by an interface 46 provide for switching of the supplies of the emitter transducers so as to effect sequential scanning of the horizon sector by sector as described in connection with FIG. 5.

Fans 51 keep the amplifier 48 cool.

The entire system is in form of drawers, not illustrated, accommodated in a metal cupboard, also not illustrated. The cupboard has ventilation inlets fitted with dust filters. The control means 42, the generator 43, the sequences 44, the coder 45 and the interface 46 are designed in accordance with digital technique, whereas the conditioner 47 and the control means 49 are designed in accordance with analogue technique.

These components are constructed with the aid of analogue and digital integrated circuits and discrete electronic and electrical members provided on insertable printed circuits.

The supply means 41, the amplifier 48 and the relays 50 are constructed with the aid of readily obtainable electronic, electric or electro-mechanical components.

It will be understood that it is possible, as technology develops, to modify the design of the circuits, in particular by making use of a micro-processing system for the entire digital part. It will further be noted that the electronic components of the control circuit, are principally known to the one skilled in the art.

We claim:

1. An electro-acoustic device for the underwater signalling and identification of a vessel, comprising:
an emitter having at least one electro-acoustic transducer mounted at subaqueous parts of the hull of the vessel, and an electronic circuit for controlling said transducer, the emitter being designed to emit, at audio-frequency, an identification signal specific to the vessel, said signal being constituted by a series of letters or figures emitted in code and preceded by a start-of-emission signal, the emitter and its control circuit being so rated that the signal is emitted at at least one frequency selected for each vessel and being within the range 4 to 6 kHz and simultaneously in the proper sound spectrum of the vessel, but above the discrete frequencies of the vertical lines of said spectrum and different from their harmonics and at a strength such that the level of acoustic intensity $LI_{s1}$ (dB), by unit of distance, of the identification signal of mean frequency $f_s$ (Hz), is greater than or equal to the level of acoustic intensity $LI_{b1}$, by unit of distance, of the sound band, centered on the frequency $f_b$ (Hz), resulting in the detection, from a great distance, of the carrier vessel by its particular underwater noise in the ambient background noise of the sea, increased by a parameter $\Delta$ the value of which in decibels is calculated by means of the relationship:

$$\Delta = 40\alpha_s + 10 \log (B_{cs}/B_{cb}) - 15 \log (f_s/f_b) + 6,$$

wherein:
$\alpha_s$ = the coefficient of absorption of sound in the sea at the frequency $f_s$,
$B_{cs}$ and $B_{cb}$ (Hz) = the critical screening bands at the frequencies $f_s$ and $f_b$ respectively.

2. The device according to claim 1, wherein said electronic circuit and said emitter are designed to emit a signal having an intensity in terms of $\Delta$ of 7, 14 and 19 dB for corresponding frequencies of 4, 5 and 6 kHz.

3. The device according to claim 1, wherein said electronic circuit and said emitter are designed to produce, in code, signs representing figures and letters, the duration of which is from about 100 to about 800 ms, the gaps between signs being about 800 ms and the gaps between groups of signs, which represent a figure or letter, being about 1600 ms.

4. The device according to claim 3, wherein said electronic circuit is designed to produce an identification signal in Morse code, the dot signs having a duration of about 200 ms and the dash signs a duration of about 700 ms.

5. The device according to claim 3, wherein said electronic circuit is designed to produce a signal at two frequencies $f_1$ and $f_2$ differing from each other by several tens of Hz up to about 200 Hz, the odd signs in the succession of signs forming the signal being transmitted at the frequency $f_1$, and the even signs forming the signal being transmitted at the frequency $f_2$.

6. The device according to claim 1, wherein said emitter comprises a plurality of transducers, said electronic circuit being designed to supply said transducers at least two by two, so as to cover the horizon in several sectors.

7. The device according to claim 6, wherein said emitter comprises four transducers arranged to form a square, the control circuit having switches adapted to connect the transducers two by two in opposite phase in two times four successive arrangements, each forming a sequence, so as to cover the horizon in two times four emission sectors, a complete signal code being emitted for each two by two arrangement, with intermediate pauses.

8. The device according to claim 1, wherein said emitter is mounted in a water-tight case near the bottom of the vessel above a window formed in the hull, the transducer or transducers being positioned vertically with their emission diaphragms substantially in the plane of the opening in the hull.

9. The device according to claim 1, wherein said electronic circuit of the emitter comprises an impulse generator functioning as a timer and connected to a sequencer controlling the succession of operations terminating in the formation of the coded signal, itself connected with the emitter through an encoder producing at least one signal-emission frequency, and through an amplifier, the generator being connected to a control panel enabling all the emission parameters to be selected.

10. The device according to claim 9, wherein said encoder is connected to said amplifier through a wave form converter for transforming the square impulses, produced by said encoder, into sinusoidal impulses, and in that switching relays for the transducers are arranged between said amplifier and said emitter, the relays being controlled, by way of an interface, by the sequencer connected directly to said control panel.

* * * * *